United States Patent
Wolf et al.

(10) Patent No.: US 9,567,015 B2
(45) Date of Patent: Feb. 14, 2017

(54) REAR AIR-GUIDING DEVICE

(71) Applicant: Dr. Ing. h.c. F. Porsche Aktiengesellschaft, Stuttgart (DE)

(72) Inventors: Thomas Wolf, Leonberg (DE); Dominik Beierl, Korntal-Muechingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 3 days.

(21) Appl. No.: 14/659,913

(22) Filed: Mar. 17, 2015

(65) Prior Publication Data

US 2015/0274223 A1 Oct. 1, 2015

(30) Foreign Application Priority Data

Mar. 26, 2014 (DE) ........................ 10 2014 104 157

(51) Int. Cl.
*B62D 35/00* (2006.01)
(52) U.S. Cl.
CPC ................... *B62D 35/007* (2013.01)
(58) Field of Classification Search
CPC .................................................. B62D 35/007
USPC ............... 296/146.16, 180.1, 180.5, 217, 91
See application file for complete search history.

(56) References Cited

U.S. PATENT DOCUMENTS

| | | | |
|---|---|---|---|
| 6,030,028 A | 2/2000 | Radmanic et al. | |
| 6,378,932 B1* | 4/2002 | Fasel | B62D 35/001 180/903 |
| 6,447,050 B1* | 9/2002 | Plassmeyer | B60J 7/22 296/107.09 |
| 7,226,117 B2* | 6/2007 | Preiss | B62D 35/007 296/180.1 |
| 7,878,582 B2* | 2/2011 | Fidan | B60J 7/223 296/217 |
| 8,226,153 B2* | 7/2012 | Molnar | B62D 35/007 296/180.1 |
| 2006/0043770 A1 | 3/2006 | Preiss | |

FOREIGN PATENT DOCUMENTS

DE 197 32 698 7/1998
DE 10 2004 041 720 3/2006

* cited by examiner

*Primary Examiner* — Glenn Dayoan
*Assistant Examiner* — Sunsurraye Westbrook
(74) *Attorney, Agent, or Firm* — Gerald E. Hespos; Michael J. Porco; Matthew T. Hespos

(57) ABSTRACT

A rear air-guiding device (20) for a fastback motor vehicle (10) is arranged in the region of a roof rear edge (15) above a rear window (13) and includes an air-guiding element (22) that is movable from a rest position (30) into at least one operational position (31; 32). The rear air-guiding device has a gap sealing device that seals off a gap between a leading edge of the air-guiding element (22) and a body surface when the air-guiding device (20) is in the operational position (31; 32) and around which air would flow during driving.

4 Claims, 2 Drawing Sheets

REAR AIR-GUIDING DEVICE

CROSS REFERENCE TO RELATED APPLICATION

This application claims priority under 35 USC 119 to German Patent Appl. No. 10 2014 104 157.7 filed on Mar. 26, 2014, the entire disclosure of which is incorporated herein by reference.

BACKGROUND

1. Field of the Invention

The invention relates to a rear air-guiding device for a fastback motor vehicle. The air-guiding device is arranged in the region of a roof rear edge above a rear window and comprises an air-guiding element that is movable from a rest position into at least one operational position. The invention also relates to a fastback motor vehicle having a rear air-guiding device of said type and to a method for operating a rear air-guiding device of said type.

2. Description of the Related Art

German patent DE 197 32 698 C1 discloses a device for actuation of a rear spoiler between a retracted rest position and a deployed working position. German laid-open specification DE 10 2004 041 720 A1 discloses a rear air-guiding device arranged in the region of a roof rear edge above a rear window of a fastback motor vehicle.

It is an object of the invention to improve the effectiveness and/or efficiency in the operation of a rear air-guiding device arranged in a region of a roof rear edge above a rear window and where the air-guiding device has an air-guiding element that is movable from a rest position into at least one operational position.

SUMMARY OF THE INVENTION

The invention relates to a rear air-guiding device for a fastback motor vehicle. The air-guiding device is arranged in the region of a roof rear edge above a rear window and comprises an air-guiding element that is movable from a rest position into at least one operational position. The air-guiding device has a gap sealing device that seals off a gap that would otherwise be present in the operational position between a leading edge of the air-guiding element and a body surface around which air flows during driving. Sealing off the gap between the leading edge of the air-guiding element and the body surface prevents an undesired flow under the air-guiding element.

The gap sealing device may also seal off a gap present in the rest position between the leading edge of the air-guiding element and the body surface around which air flows during driving. In this way, an undesired flow under the air-guiding element also can be prevented in a simple manner in the rest position.

The gap sealing device also seals off a gap present in a second operational position between the leading edge of the air-guiding element and the body surface around which air flows during driving. In the rest position, the air-guiding element preferably is stowed so as to be flush with a roofline. In the first operational position, the air-guiding element preferably is deployed and is turned up to prevent undesired rear axle lift during operation of the fastback motor vehicle. The air-guiding element preferably is deployed or folded out even further than in the second operational position than in the first operational position. Thus, the undesired rear axle lift can be reduced yet further. The second operational position preferably corresponds to a sport position of the air-guiding element.

The air-guiding device may comprises a sealing lip that is attached to the air-guiding element in the region of the leading edge. The sealing lip may be fastened to the air-guiding device by suitable fasteners. The sealing lip may however also be connected integrally to the air-guiding device. According to a further aspect of the invention, the sealing lip may be injection-molded onto the air-guiding device.

The sealing lip may be formed from a flexible and/or elastic material. In this way, it is achieved in a simple manner that the sealing lip can seal off the gap between the body surface around which air flows during driving operation and the air-guiding element in all positions of the air-guiding device,.

The air-guiding element may be a spoiler blade. The gap sealing device provides a simple prevention of an undesired flow under the spoiler blade during operation of the fastback motor vehicle is prevented in a simple manner.

The spoiler blade may constitute an airfoil profile. The effectiveness and/or efficiency of the rear air-guiding device is further improved in this way.

The invention also relates to a fastback motor vehicle having the above-described rear air-guiding device.

The invention also relates to a method for operating a rear air-guiding device in or on a fastback motor vehicle as described above. The method includes sealing off a gap that would otherwise be present in the operational position between the leading edge of the air-guiding element and the body surface around which air flows during driving so that flow does not pass under the air-guiding element. The effectiveness and/or efficiency in the operation of the rear air-guiding device is improved considerably in this way.

The method sealing off a gap present in the rest position and/or in the second operational position between the leading edge of the air-guiding element and the body surface around which air flows during driving so that flow does not pass under the air-guiding element.

Further advantages, features and details of the invention will emerge from the following description, in which various exemplary embodiments will be described in detail with reference to the drawing.

DETAILED DESCRIPTION OF THE PREFERRED EMBODIMENTS

Figure 1:
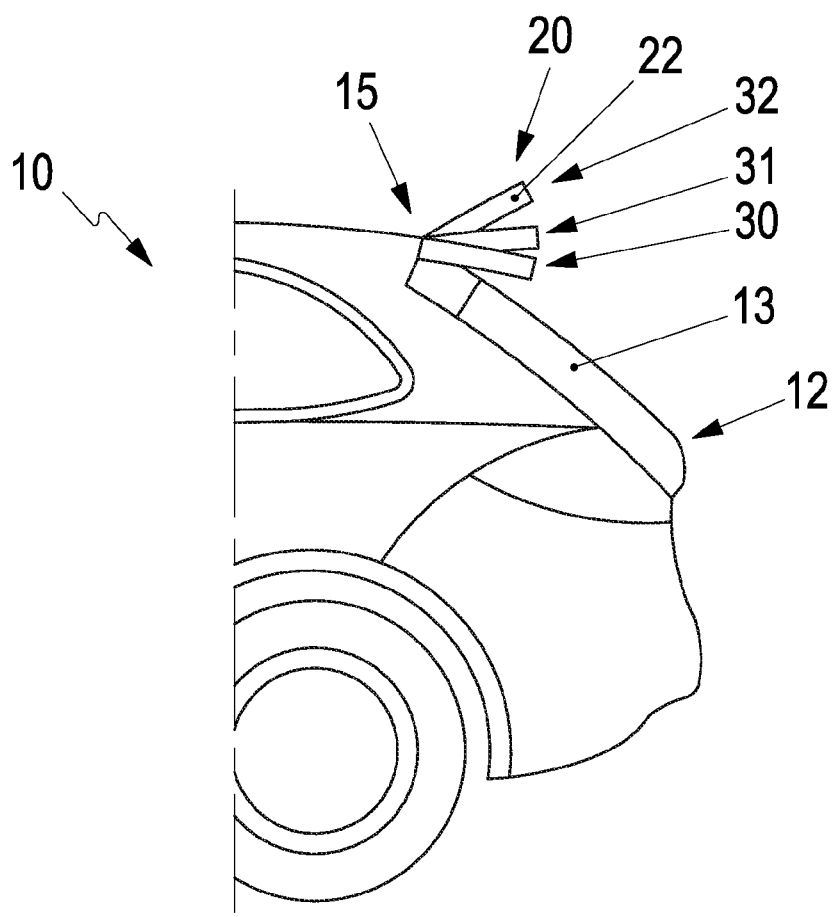
FIG. 1 is a simplified illustration of a rear end of a fastback motor vehicle with a rear air-guiding device.

FIG. 1 illustrates, in simplified form, a fastback motor vehicle 10 with a tailgate 12 and a rear window 13. A rear air-guiding device 20 is arranged at a roof rear edge 15 of the fastback motor vehicle 10. The rear air-guiding device 20 comprises an air-guiding element 22 that is movable from a rest position 30 into a first operational position 31 or into a second operational position 32.

In the rest position of the rear air-guiding device 20, the air-guiding element 22 is stowed so as to be flush with a roofline. The rest position 31 also is referred to as the retracted position. In the rest position 30, the air-guiding element 22 is inclined slightly down so as to yield a slightly downwardly sloping airflow during operation of the fastback motor vehicle 10.

The slightly downwardly sloping flow-off direction reduces the wake and weakens undesired turbulence behind the fastback motor vehicle 10. In this way, the air resistance of the fastback motor vehicle 10 can be reduced to achieve a positive effect on the energy consumption of the fastback motor vehicle 10.

The air-guiding device 20 is operated with the air-guiding element 22 in its rest position 30 at driving speeds below a speed threshold of, for example, two hundred kilometers per hour.

The air-guiding element 22 is arranged substantially horizontally in its first operational position 31. In this way, undesired rear axle lift of the fastback motor vehicle 10 can be reduced. However, the air resistance of the air-guiding element 22 in its first operational position 31 is higher than that in its rest position 30.

The air-guiding device 20 is operated with the air-guiding element 22 in its first operational position 31 preferably at driving speeds above the speed threshold of, for example, two hundred kilometers per hour.

In its second operational position 32, the air-guiding element 22 of the rear air-guiding device 20 is folded out yet further. A trailing edge of the air-guiding element 22 is even higher in the second operational position 32 than in the first operational position 31. In this way, the rear axle lift can be reduced yet further.

In this way, it is possible in a simple manner to realize maximum driving dynamics, for example on a circuit. The second operational position 32 therefore also is referred to as the sport position of the air-guiding device 20. The second operational position 32 however is not a so-called braking position.

Figure 2:
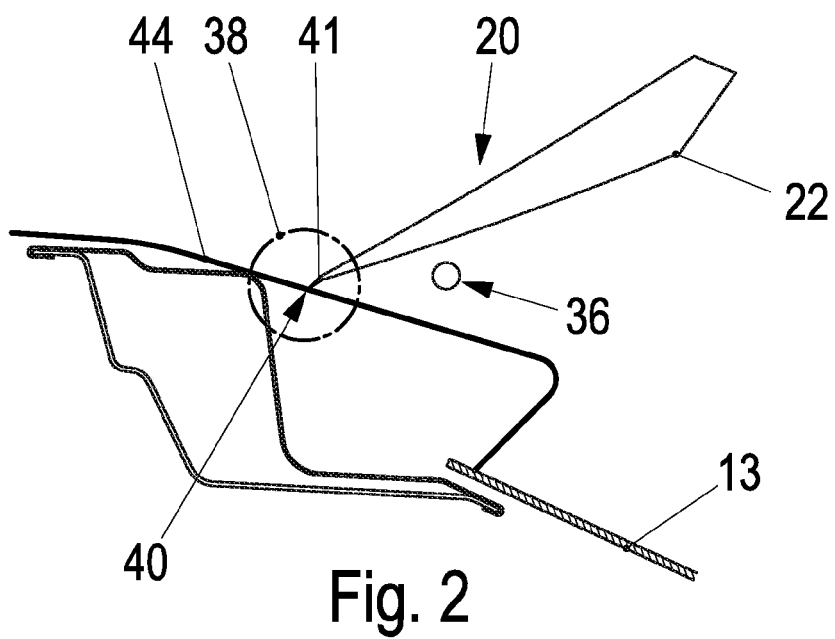
FIG. 2 is an enlarged illustration of the rear air-guiding device from FIG. 1 with an air-guiding element in a second operational position.

FIG. 2 illustrates a circle 36 that identifies a center of rotational or pivotal movement about which the air-guiding element 22 of the rear air-guiding device 20 is pivoted between its rest position and its operational positions. A dashed circle 38 highlights a region of a leading edge of the air-guiding element 22.

A gap could exist between the leading edge of the air-guiding element 22 of the air-guiding device 20 in the operational position and a body surface 44, and air could flow through this gap when driving the vehicle. However, a gap sealing device 40 seals a gap between the leading edge of the air-guiding element 22 of the air-guiding device 20 in the operational position and a body surface 44, as illustrated in FIG. 2, and air that could flow through this gap during driving is sealed off by the gap sealing device 40.

The gap sealing device 40 comprises a sealing lip 41 that is fastened to the air-guiding element 22 in the region of the leading edge. The air-guiding element 22 preferably is designed as a spoiler blade with an airfoil profile. The sealing lip 41 preferably is formed from an elastic plastic or rubber material. The sealing lip 41 advantageously is injection-molded onto the spoiler blade.

Figure 3:
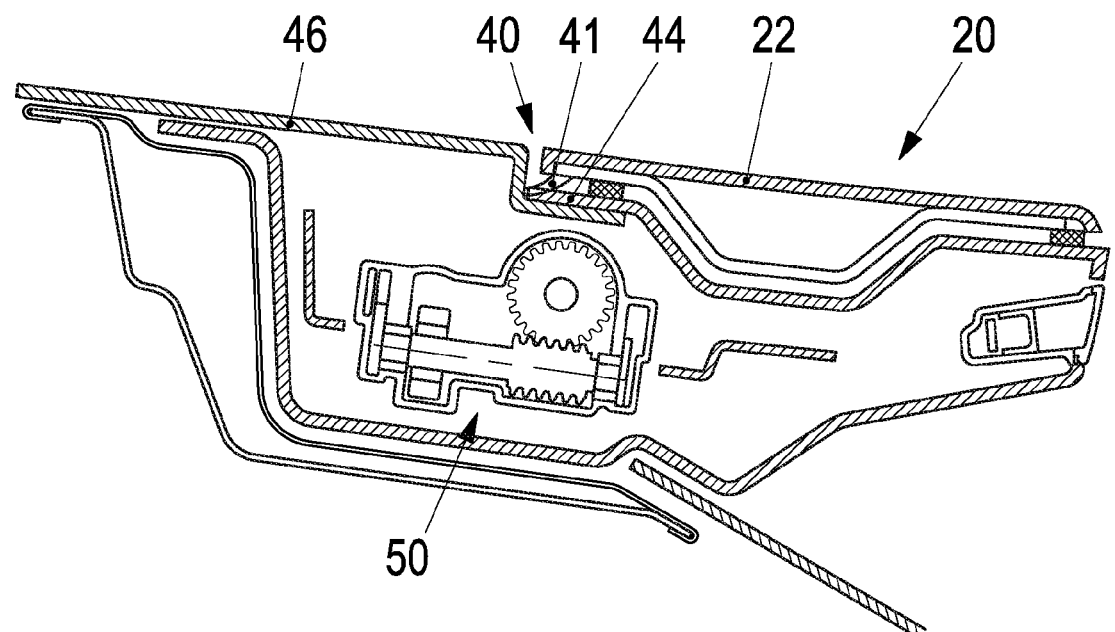
FIG. 3 is an illustration similar to that in FIG. 2, with the air-guiding element in a rest position.

The air-guiding element 22, in its rest position, may form an elongation of a roofline 46, as shown in FIG. 3. The air-guiding element 22 can be deployed from its rest position illustrated in FIG. 3 into at least one operational position by a drive device 50. The drive device 50 in FIG. 3 comprises a gearwheel that meshes with a toothed rack.

Figure 4:
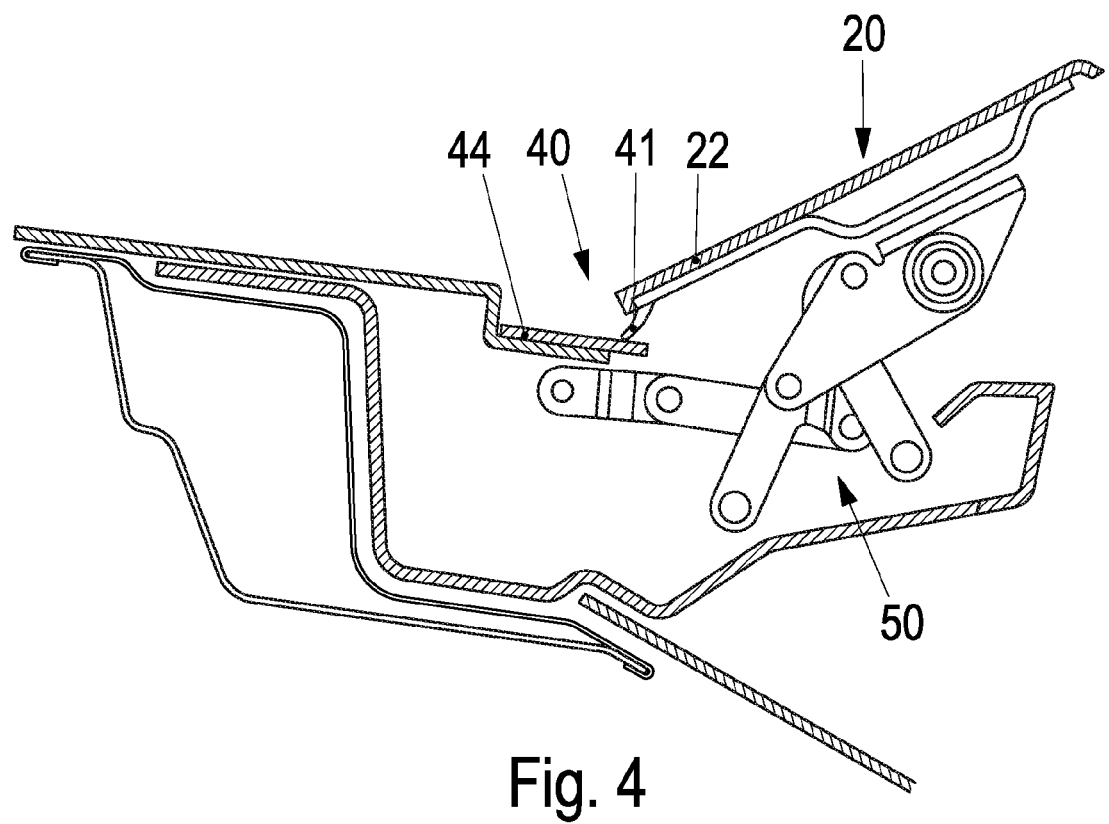
FIG. 4 is an illustration similar to that in FIG. 3, with the air-guiding element in a first operational position.

FIG. 4 is an illustration similar to FIG. 3. However, in FIG. 4 the air-guiding element 22 is in one of its operational positions. In FIG. 4, the drive device 50 is a multi-link mechanism. The air-guiding element 22 can be deployed from its rest position (FIG. 3) into an operational position or into different operational positions by the drive device 50.

FIGS. 3 and 4 show that the gap sealing device 40 of the invention is achieved in a simple manner in that an air gap that otherwise is present between the leading edge of the air-guiding element 22 and the body surface 44 is sealed off. The sealing lip 41 prevents flow from passing under the air-guiding element 22 in an undesired manner both in the rest position (FIG. 3) of the air-guiding element 22 and also in the operational position (FIG. 4) of said air-guiding element.

What is claimed is:

1. A fastback motor vehicle, comprising: a roof with a rear edge; a rear window rearward of and lower than the rear edge of the roof; a rear air-guiding device arranged in a region of the rear edge of the roof and above the rear window, the rear air-guiding device including an air-guiding element that is movable between a rest position and at least one operational position; and a gap sealing lip formed from a flexible material and attached to a region of a leading edge of the air-guiding element, the gap sealing lip being sealingly engaged with the region of the rear edge of the roof so that the sealing lip seals off a gap between the leading edge of the air-guiding element and a body surface of the motor vehicle in the rest position and in the at least one operational position of the air-guiding element so that an air flows between the air-guiding element and the body surface is prevented during driving.

2. The fastback motor vehicle of claim 1, wherein the air-guiding element is a spoiler blade.

3. The fastback motor vehicle of claim 2, wherein the spoiler blade is an airfoil profile.

4. The fastback motor vehicle of claim 1, wherein the sealing lip is injection molded onto the air-guiding element.

* * * * *